United States Patent
Kent, III et al.

(10) Patent No.: US 7,187,735 B2
(45) Date of Patent: Mar. 6, 2007

(54) MIXED TECHNOLOGY MEMS/SIGE BICMOS DIGITALIZED ANALOG FRONT END WITH DIRECT RF SAMPLING

(75) Inventors: Samuel D. Kent, III, Long Beach, CA (US); Lloyd F. Linder, Agoura Hills, CA (US); Khiem V. Cai, Brea, CA (US)

(73) Assignee: Raytheon Company, Waltham, WA (US)

(*) Notice: Subject to any disclaimer, the term of this patent is extended or adjusted under 35 U.S.C. 154(b) by 807 days.

(21) Appl. No.: 10/352,407

(22) Filed: Jan. 28, 2003

(65) Prior Publication Data

US 2004/0146127 A1    Jul. 29, 2004

(51) Int. Cl.
*H03H 9/00* (2006.01)
*H04B 1/10* (2006.01)

(52) U.S. Cl. .................. 375/350; 455/307; 455/339; 333/186

(58) Field of Classification Search ............... 375/346, 375/350; 455/307, 334, 339; 333/186, 194
See application file for complete search history.

(56) References Cited

U.S. PATENT DOCUMENTS

| | | | | |
|---|---|---|---|---|
| 6,005,506 A | * | 12/1999 | Bazarjani et al. | 341/143 |
| 6,426,983 B1 | * | 7/2002 | Rakib et al. | 375/346 |
| 6,512,803 B2 | * | 1/2003 | Heinzl et al. | 375/350 |
| 6,566,786 B2 | * | 5/2003 | Nguyen | 310/309 |
| 2002/0158700 A1 | * | 10/2002 | Nemoto | 331/158 |

* cited by examiner

Primary Examiner—Jay K. Patel
Assistant Examiner—David B. Lugo
(74) Attorney, Agent, or Firm—Leonard A. Alkov; Karl A. Vick

(57) ABSTRACT

A digitizing analog front end (DAFE) using mixed technology on a single substrate is described. SiGe BiCMOS technology is implemented for the semiconductor components, which include a low noise amplifier and an analog-to-digital converter. Micro Electro Mechanical System (MEMS) switches are used to change the filtering characteristics of several filters, including an anti-aliasing filter and a pre-select and anti-jamming filter.

13 Claims, 4 Drawing Sheets

MIXED TECHNOLOGY MEMS/SIGE BICMOS DIGITALIZED ANALOG FRONT END WITH DIRECT RF SAMPLING

FIELD OF THE INVENTION

The present invention relates to protection of analog to digital converters (ADC), to the reduction of power consumption and to the maintenance of high signal quality in a radio receiver's analog front end in the presence of large interfering and jamming signals. More particularly, the invention relates to a single chip receiver utilizing micro electromechanical system (MEMS) technology to receive wideband or spread-spectrum signals in a jamming environment with a low resolution ADC, such as in a Global Positioning System (GPS) receiver.

BACKGROUND OF THE INVENTION

This invention is applicable to all communication systems. A spread-spectrum system will be used to illustrate its use and effectiveness. Spread-spectrum communication systems transmit information digitally on a carrier that has been modulated with a high-rate pseudorandom binary sequence. The spectrum of the resulting signal occupies a large bandwidth and appears noise-like. The signal is subject to intentional or unintentional jamming. Jamming occurs by transmission of large radio frequency signals in nearby or coincident radio spectrum. Jamming signals located out of the desired signal's band are usually removed using a preselector filter. Thus, it is the in band signals that present the greater obstacle to accurate reception of the transmitted signal.

Suppressing these interferences can be accomplished with the use of RF notch filters. When implemented with MEMS technology, this is a low cost, low power solution and low distortion for interference suppression. A notch filter is particularly effective in suppressing continuous wave (CW) or narrowband interferers. After these interferers are removed, the receiver can process the spread spectrum signal as if the interference is absent with a small loss, proportional to the bandwidth being removed. For interference-free spread spectrum signals the received signal can be processed with a very low resolution ADC. For example a 1-bit ADC has a degradation of 1.059 dB with baseband I and Q sampling or 1.96 dB with intermediate frequency (IF) sampling against Additive White Gaussian Noise (AWGN). A 2-bit ADC has a 0.55 dB degradation with baseband I and Q sampling or 0.96 dB with IF sampling. Therefore, to maintain good performance with a low ADC complexity and low power consumption, a method of eliminating the jammers from the received signal should be used.

Another effect on system design and system performance in a jamming environment is in power consumption and signal distortion. In a jamming environment when the jamming signals are not removed near the antenna, the components in the analog front end must be designed with high linearity at the cost of significantly higher power consumption. Also, the presence of large signals puts greater demands on the phase noise requirements of the system. To decrease both the high linearity and phase noise requirements, it is necessary to remove the jammers before these components.

Analog excision methods can eliminate both narrow and wideband jamming signals using passive components. However, since the jamming signals can be located anywhere within the passband, some method for steering, inserting, and removing the excising circuitry from the signal path must be used. Generally, filtering techniques implemented in current receivers use semiconductor switching, e.g., semiconductor transistors, to alter the filters' characteristics. The filters' characteristics may be altered by switching in different components (e.g., banks of capacitors) or different filters altogether. Semiconductor switching, due to the semiconductor's limited isolation characteristics, may allow parasitic capacitances from non-selected filters and/or components to effect the performance of a selected filter, resulting in distortion of the filtered signal.

From the discussion above, it is apparent that there is a need in the art for a low power, low distortion mechanism for protecting a receiver's front end for use in multiple applications.

SUMMARY OF THE INVENTION

In the light of the foregoing, the invention relates to an integrated circuit digitizing analog front end for a receiver, which includes a substrate; a low noise amplifier (LNA) on the substrate; an analog-to-digital converter (ADC) on the substrate; a plurality of micro electro mechanical system (MEMS) switches on the substrate; at least one anti-alias filter on the substrate; and at least one anti-jam filter on the substrate, wherein the filter characteristics of the at least one anti-jam filter and the at least one anti-alias filter are changed using at least one of the plurality of MEMS switches.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
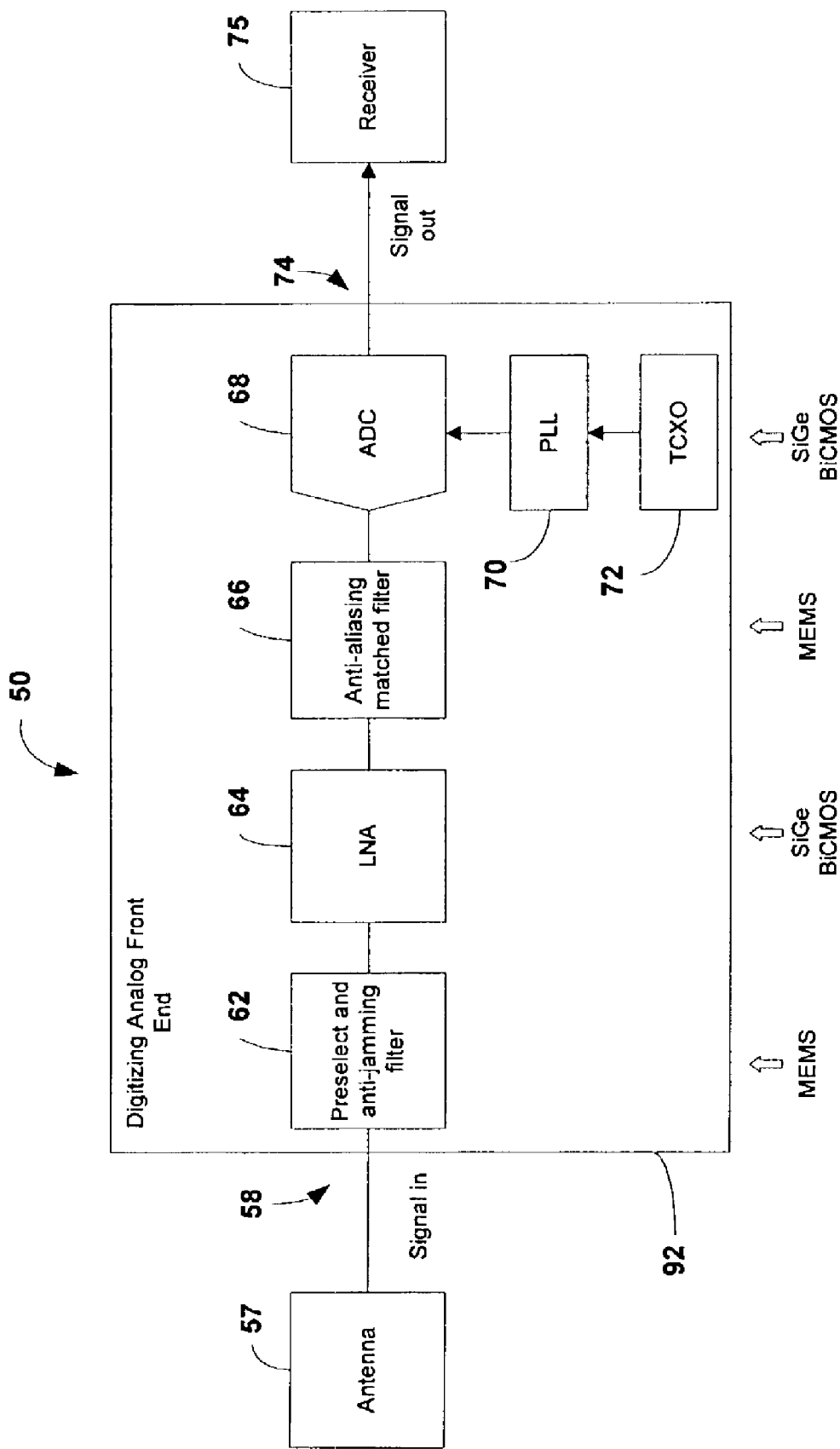
FIG. 1 is a block diagram of a digitizing analog front end (DAFE) in accordance with an embodiment of the invention.

The following is a detailed description of the present invention with reference to the attached drawings, wherein like reference numerals will refer to like elements throughout.

Referring now to FIG. 1, a digitizing analog front end (DAFE) 50 in accordance with one embodiment of the present invention is illustrated. An antenna or antenna array 57 for receiving a composite radio signal is connected to an input port 58 of the DAFE 50. Upon entering the DAFE 50, the composite signal enters a pre-selector and anti-jamming filter (PS/AJ) 62 for pre-selection of the desired frequency band and for excision of narrow band jammers. The output of the PS/AJ filter 62 is electrically connected to the input of a low noise amplifier (LNA) 64. The pre-selection portion of the PS/AJ filter 62 provides coarse filtering to reduce saturation of the LNA 64 by out of band jamming, co-site or ambient signals.

The output of the LNA is electrically connected to the input of an anti-aliasing matched filter 66. The output of the anti-aliasing matched filter 66 is electrically connected to the input of an analog-to-digital converter (ADC) 68, such as a direct sampling/under sampling ADC, for example. The anti-aliasing matched filter 66 has a cutoff frequency that attenuates unwanted signals from the ADC input to the point that they will not adversely affect the circuit. A supporting phase-locked loop (PLL) 70 and temperature compensated crystal oscillator (TCXO) 72 provide timing signals for the ADC 68. The ADC 68 provides an output 74 of the DAFE 50, which may be connected to a receiver 75, such as a GPS receiver, for example.

The implementation of a direct sampling/under sampling ADC 68 can reduce the complexity of the overall DAFE 50. By performing bandpass sampling, the receiver design is simplified by eliminating one or more stages of mixers, thus reducing the circuit size and power requirements. Furthermore, the signal quality increases through direct in-phase and quadrature-phase projection by avoiding amplitude and phase offsets inherent in quadrature demodulation.

The DAFE 50 preferably employs mixed technology, including Micro Electro Mechanical System (MEMS) technology and, for example, BiCMOS technology on a single substrate 92. In particular, the PS/AJ filter 62 and the anti-aliasing matched filter 66 are implemented using MEMS technology, while the LNA 64, ADC 68 and PLL 70 may be implemented using SiGe BiCMOS technology, for example. The benefits of a mixed technology approach include a reduction in size and in power consumption of the DAFE 50. Size reduction is a result of the integration of many different functions onto a single chip. Power savings results from use of a power efficient SiGe BiCMOS process, the use of an under sampling ADC, and MEMS technology.

The use of an under sampling ADC 68 allows the elimination of at least one down conversion stage including mixers and PLLs. The inventors estimate an additional 40% power savings due to elimination of the down conversion stage. Further power savings may be realized through the use of passive, high-Q filtering elements using MEMS technology. In particular, MEMS technology allows the creation of small, low power, low distortion and jammer resistant filters.

The structure of the PS/AJ filter 62 is dependent upon the method chosen to implement the narrowband jammer excision. Exemplary designs for PS/AJ filters include a sub-band bandpass approach, which will pass only a non-jammed portion of the signal, and a notch filter approach, which will remove the jammer. Depending on the size and complexity of the PS/AJ filter, switchable filter banks may be employed to permit the DAFE 50 to detect several different frequency bands. To reduce the effects of parasitic capacitance that could be introduced from the presence of the unused filters, high isolation MEMS switches are used to disconnect the unused filters from the circuit. Additionally, the sub-band approach has the added benefit of eliminating the need for an additional anti-aliasing filter as this function is a natural byproduct of the sub-band structure.

Figure 2A:
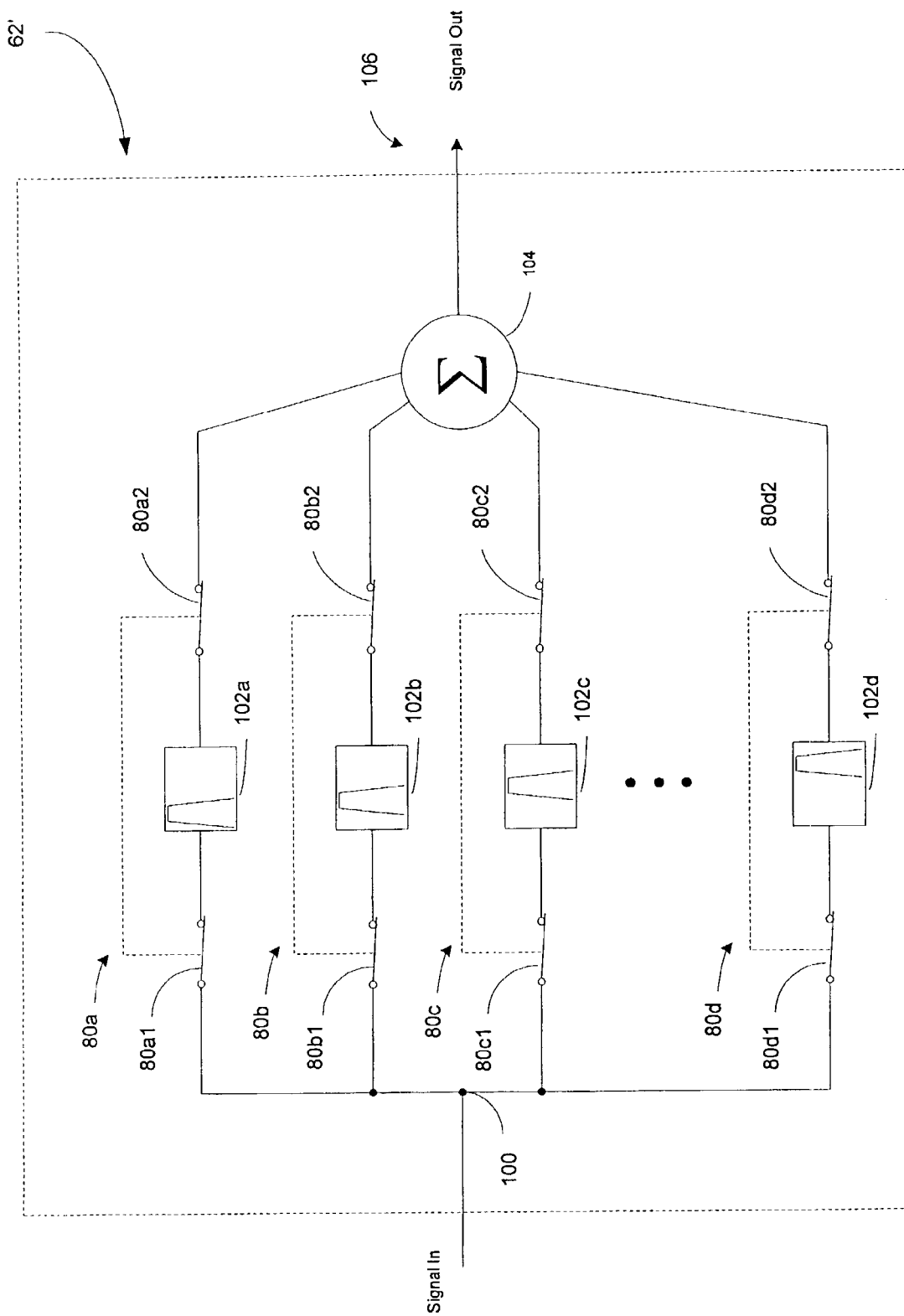
FIG. 2A is an anti-jam filter implemented using a sub-band bandpass approach in accordance with an embodiment of the invention.

Referring to FIG. 2A, an embodiment using a sub-band bandpass implementation of the PS/AJ filter is illustrated. The PS/AJ filter 62' incorporates MEMS switches 80a–80d for selecting the filtering characteristics of the filter 62'. A MEMS switch provides several advantages over a semiconductor switch (e.g., semiconductor transistors, pin diodes). In particular, a MEMS switch has a very low insertion loss (e.g., less than 0.2 dB at 45 GHz) and a high isolation when open (e.g., greater than 30 dB). In addition, the switch has a large frequency response and a large bandwidth compared to semiconductor transistors and pin diodes. These advantages provide enhanced performance and control when used in tunable filter designs. Additional details relating to MEMS switches can be found in U.S. Pat. No. 6,046,659, the disclosure of which is herein incorporated by reference in its entirety.

The MEMS switches used in the PS/AJ filter 62' are double pole single throw (DPST) switches (e.g., two isolated switch contacts that open and close together). It should be appreciated, however, that other configurations of MEMS switches may be utilized and the use of a DPST switch is merely exemplary. Furthermore, FIG. 2A shows a sub-band bandpass implementation using four MEMS switches and four sub-band filter banks. It should be appreciated, however, that implementations of a sub-band bandpass filter utilizing more or fewer MEMS switches and/or sub-band filter banks may be used, and such implementations are contemplated to be in the scope of the invention.

It is noted that control lines to command each MEMS switch to "open" and "close" are not shown in the diagrams. These control lines, however, would be evident to one skilled in the art. The open and close action of each MEMS switch is achieved by applying a bias voltage to one or more control terminals of the MEMS switch. For example, a single pole MEMS switch may have four terminals, two terminals for the isolated switch contact, and two terminals for a "control" connection, e.g., to command the switch to open and close. When a voltage is applied to the control terminals of the MEMS switch, an electrostatic force pulls an armature towards the substrate. If the switch is a normally open (N.O.) configuration, then the isolated switch contact will close upon the application of the voltage. Conversely, if the switch is a normally closed (N.C.) switch, then the isolated switch contact will open upon application of the voltage. It follows that multiple pole MEMS switches will have an additional pair of terminals for each additional pole.

A first terminal on a first pole 80a1 of a first MEMS switch 80a is connected to an input node 100. A second terminal on the first pole 80a1 of the first MEMS switch 80a is connected to an input terminal of a first sub-band filter bank 102a. An output terminal of the first sub-band filter bank 102a is connected to a first terminal on a second pole 80a2 of the first MEMS switch 80a. A second terminal on the second pole 80a2 of the first MEMS switch 80a is connected to a summing junction 104.

A first terminal on a first pole 80b1 of a second MEMS switch 80b is connected to the input node 100. A second terminal on the first pole 80b1 of the second MEMS switch 80b is connected to an input terminal of a second sub-band filter bank 102b. An output terminal of the second sub-band filter bank 102b is connected to a first terminal on a second pole 80b2 of the second MEMS switch 80b. A second terminal on the second pole 80b2 of the second MEMS switch 80b is connected to the summing junction 104.

A first terminal on a first pole 80c1 of a third MEMS switch 80c is connected to the input node 100. A second terminal on the first pole 80c1 of the third MEMS switch 80c is connected to an input terminal of a third sub-band filter bank 102c. An output terminal of the third sub-band filter bank 102c is connected to a first terminal on a second pole

80c2 of the third MEMS switch 80c. A second terminal on the second pole 80c2 of the third MEMS switch 80c is connected to the summing junction 104.

A first terminal on a first pole 80d1 of a fourth MEMS switch 80d is connected to the input node 100. A second terminal on the first pole 80d1 of the fourth MEMS switch 80d is connected to an input terminal of a fourth sub-band filter bank 102d. An output terminal of the fourth sub-band filter bank 102d is connected to a first terminal on a second pole 80d2 of the fourth MEMS switch 80d. A second terminal on the second pole 80d2 of the fourth MEMS switch 80d is connected to the summing junction 104. The output 106 of the summing junction 104 is the output of the filter 62'.

The sub-band bandpass design 62', through each sub-band filter 102a–102d, divides the signal spectrum into many sub-bands. As illustrated in FIG. 2A, each filter bank 102a–102d includes a different transfer function to filter specific frequencies from the composite signal. Each sub-band can be further divided as required to achieve a minimum excisable jammer bandwidth. The output of each fixed-frequency sub-band filter 102a–102d is examined for the presence of a jammer through the use of analog power detection circuitry (not shown) that is digitally controlled, for example. Detection of jammer signals is well known by those skilled in the art and will not be discussed herein. If a jammer is not present in a particular frequency band, then the output of the fixed frequency sub-band filter is summed with the other sub-band filters. If a jammer is detected, however, then the respective MEMS switch for the particular sub-band filter 102a–102d is opened, thus removing the jammer from the spectrum. As noted previously, a MEMS switch provides several advantages over a semiconductor switch, including low insertion loss and high isolation when the switch is open. Moreover, the implementation of mixed technology, e.g., MEMS switches and SiGe BiCMOS on the same substrate, provides a compact package that consumes less power than traditional implementations.

For example, if a jammer signal were detected at the output of the fourth sub-band filter 102d and a jammer signal were not detected at the output of the remaining sub-band filters 102a–102c, then the first three MEMS switches 80a–80c would be closed allowing the "clean signal" to pass, and the fourth MEMS switch 80d would be open, thus blocking the jammer signal. Similarly, if a jammer signal were detected at the output of the first sub-band filter 102a, and a jammer signal were not detected at the output of the remaining sub-band filters 102b–102d, then the first MEMS switch 80a would be opened, thus blocking the jammer signal, and the remaining MEMS switches 80b–80d would be closed allowing the clean signal to pass.

Figure 2B:
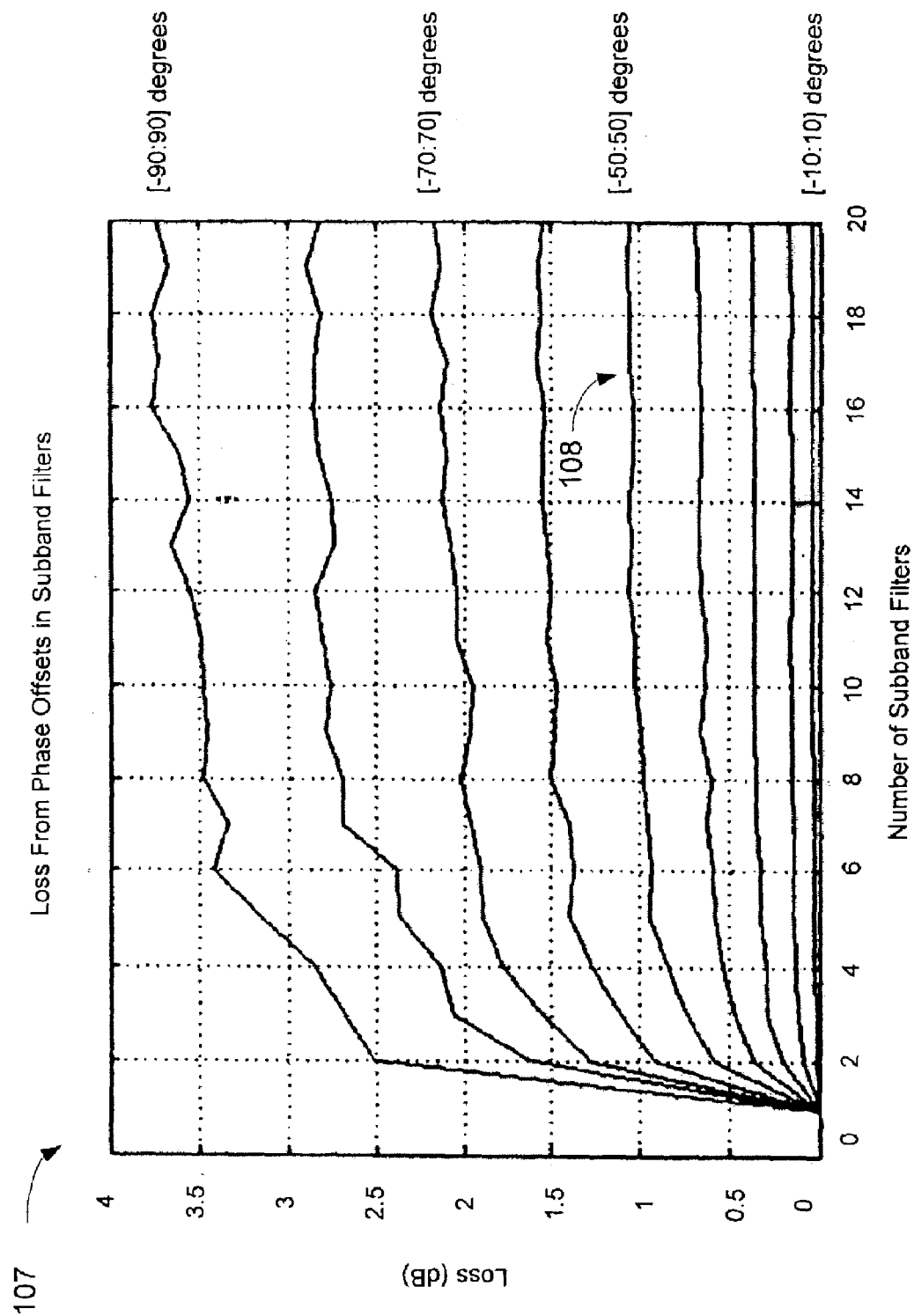
FIG. 2B illustrates the loss incurred by summing the outputs of many sub-band filters with errors uniformly distributed between $-\Phi$ and $\Phi$ degrees.

An inherent problem when using superposition of multiple sub-band filter outputs is the introduction of phase errors. Referring to FIG. 2B, a graph 107 illustrating the loss from phase offsets in sub-band filters is illustrated. In particular, the graph 107 shows that if the phase error introduced by each filter is randomly distributed within a small range, the implementation loss is small. For example, an error distribution over ±50 degrees 108 yields only a 1 dB performance loss.

Figure 3:
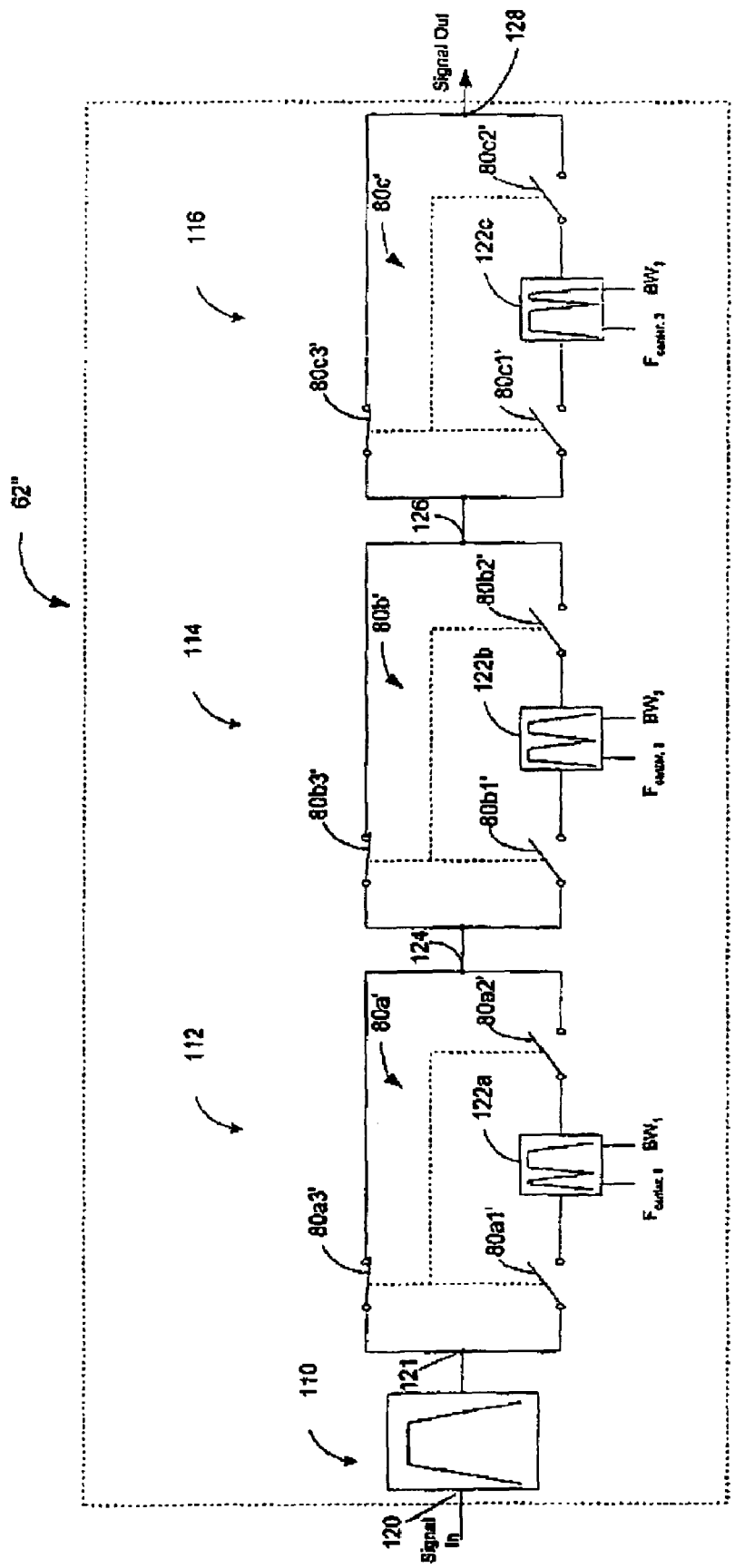
FIG. 3 is an anti-jam filter implemented using a notch filter approach in accordance with another embodiment of the invention.

Referring to FIG. 3, an alternative embodiment of the PS/AJ filter 62" using a notch filter design is illustrated. The notch filter approach requires the design and fabrication of high-Q MEMS filters that have two degrees of freedom: variability in center frequency and stop band bandwidth. In the GPS case, the center frequency should be steerable over the 20 MHz GPS bandwidth. Ideally, the notch width should be adjustable from 0 Hz to 10% of either the clear acquisition (C/A) or precision (P) code signal widths, or 200 kHz to 2 MHz, depending on which signal is being used.

The PS/AJ filter 62" includes four filter sections; a preselect filter 110 followed by three filter sections 112, 114, 116, all of which are steerable and bandwidth-adjustable. More or fewer steerable filters may be used. The PS/AJ filter 62" incorporates a 3-pole MEMS switch having two normally open (N.O.) and one normally closed (N.C.) contacts. It should be appreciated that the use of a 3-pole MEMS switch is merely exemplary and other configurations of a MEMS switch may be employed.

Referring to the PS/AJ filter 62" of FIG. 3, an anti-alias/pre-select filter 110 has a first terminal connected to an input node 120 and a second terminal connected to node 121. A first terminal on a first N.O. pole 80a1' of a first MEMS switch 80a' is connected to node 121. A second terminal on the first pole 80a1' of the first MEMS switch 80a' is connected to an input terminal of a first filter bank 122a. An output terminal of the first filter bank 122a is connected to a first terminal on a second N.O. pole 80a2' of the first MEMS switch 80a'. A second terminal on the second pole 80a2' of the first MEMS switch 80a' is connected to node 124. A first terminal on a third N.C. pole 80a3' of the first MEMS switch 80a' is connected to node 121. A second terminal on the third pole 80a3' of the first MEMS switch 80a' is connected to node 124.

A first terminal on a first N.O. pole 80b1' of a second MEMS switch 80b' is connected to node 124. A second terminal on the first pole 80b1' of the second MEMS switch 80b' is connected to an input terminal of a second filter bank 122b. An output terminal of the second filter bank 122b is connected to a first terminal on a second N.O. pole 80b2' of the second MEMS switch 80b'. A second terminal on the second pole 80b2' of the second MEMS switch 80b' is connected to node 126. A first terminal on a third N.C. pole 80b3' of the second MEMS switch 80b' is connected to node 124. A second terminal on the third pole 80b3' of the second MEMS switch 80b' is connected to node 126.

A first terminal on a first N.O. pole 80c1' of a third MEMS switch 80c' is connected to node 126. A second terminal on the first pole 80c1 of the third MEMS switch 80c' is connected to an input terminal of a third filter bank 122c. An output terminal of the third filter bank 122c is connected to a first terminal on a second N.O. pole 80c2' of the third MEMS switch 80c'. A second terminal on the second pole 80c2' of the third MEMS switch 80c' is connected to node 128. A first terminal on a third N.C. pole 80c3' of the third MEMS switch 80c' is connected to node 126. A second terminal on the third pole 80c3' of the third MEMS switch 80c' is connected to node 128.

The PS/AJ filter 62" can remove jammer signals through the manipulation of the variable center frequency and the stop bandwidth. Each filter bank 122a–122c includes a different transfer function to filter specific jammer frequencies from the composite signal. Furthermore, filter segments may be removed from the filter by closing the bypass MEMS switches 80a3'–80c3' and opening the selection MEMS switches 80a1'–80c1', 80a2'–80c2'. For example, if a single jammer is present, one of the filters 122a–122c is tuned through appropriate methods to create a passband surrounding the desired signal, but with a notch present at the location of the jammer. The tuning of this filter is accomplished using MEMS switches or other methods, which are not described here but are known in the literature. A control signal is sent to the first MEMS switch 80a', causing the third N.C. pole 80a3' to open and the first N.O. pole 80a1' and the second N.O. pole 80a2' to close, thus causing the signal and jammer to enter the first filter 122a. The first filter 122a removes some or all of the jammer and it allows only the signal and any residual jammer to pass to node 124. If no other jamming signal is present and if the first jammer has been sufficiently excised, the second filter 122b and the third filter 122c are not needed, no control signals are sent to the second MEMS switch 80b' and the third MEMS switch 80c' and the third N.C. pole 80b3' of the second MEMS switch 80b' and the third N.C. pole 80c3' of the third MEMS switch 80c' remain closed and the first and second N.O. poles 80b1', 80b2' of the second MEMS switch 80b' and the first and second N.O. poles 80c1', 80c2' of the third MEMS switch 80c' remain open. The signal at node 124 passes through to node 128. If other jammers (up to two more for the exemplary circuit of FIG. 3) are present and must be excised, or if additional attenuation of the first jammer is desired, or both, the second and third filters 122b, 122c are tuned to excise the jammers, and control signals are sent to the second MEMS switch 80b' and the third MEMS switch 80c'. Finally, if no jamming signal is present, the anti-alias filter 110 is placed in the signal path to allow only the desired signal to pass.

While particular embodiments of the invention have been described in detail, it is understood that the invention is not limited correspondingly in scope, but includes all changes, modifications and equivalents coming within the spirit and terms of the claims appended hereto. For example, the implementation of a MEMS filter has been discussed herein with reference to the PS/AJ filter 62. It will be appreciated, however, that the same principles may be applied to the anti-aliasing filter 66.

What is claimed is:

1. An integrated circuit digitizing analog front end (DAFE) for a receiver, comprising:
    a substrate;
    a low noise amplifier (LNA) on the substrate;
    an analog-to-digital converter (ADC) on the substrate;
    a plurality of micro electro mechanical system (MEMS) switches on the substrate, wherein each of the plurality of MEMS switches comprise at least one pole operative to positively couple and decouple an input of the MEMS switch to an output of the MEMS switch;
    at least one anti-alias filter on the substrate; and
    at least one and-jam filter on the substrate; wherein the filter characteristics of the at least one anti-jam filter and/or the at least one anti-alias filter are changed using at least one of the plurality MEMS switches.

2. The DAFE of claim 1, wherein the ADC is a direct sampling/under sampling ADC.

3. The DAFE of claim 1, wherein the anti-jam filter and the anti-alias filter include a switchable bank of filters, and each bank is selected using at least one MEMS switch.

4. The DAFE of claim 1, wherein the anti-jam filter is a notch filter.

5. The DAFE of claim 4, wherein the notch filter has a steerable center frequency.

6. The DAFE of claim 5, wherein a notch bandwidth is adjustable between 0 Hz and 2 MHz.

7. The DAFE of claim 1, wherein the anti-jam filter is a sub-bandpass filter.

8. The DAFE of claim 1, further comprising:
    a phase locked loop (PLL) on the substrate; end
    a crystal oscillator on the substrate.

9. The DAFE of claim 8, wherein the crystal oscillator is temperature compensated.

10. The DAFE of claim 8, wherein the anti-jam filter and the anti-alias filter include a switchable bank of filters, and each bank is selected using at least one MEMS switch.

11. The DAFE of claim 1, wherein the LNA and ADC are implemented using SiGe BICMOS technology, and the anti-alias filter and the anti-jam filter are implemented using MEMS technology.

12. The DAFE of claim 1, wherein the at least one anti-alias filter or the at least one anti-jam filter includes a plurality of filter banks, and the at least one MEMS switch includes a plurality of poles, said at least one MEMS switch operable to remove at least one of the plurality of filter banks such that the at least one filter bank is isolated from the remaining filter banks.

13. The DAFE of claim 1, wherein said plurality of MEMS switches are discrete from the anti-jam filter and the anti-alias filter.

* * * * *